United States Patent
Almazán et al.

(10) Patent No.: US 11,676,034 B2
(45) Date of Patent: Jun. 13, 2023

(54) INITIALIZATION OF CLASSIFICATION LAYERS IN NEURAL NETWORKS

(71) Applicant: The Nielsen Company (US), LLC, New York, NY (US)

(72) Inventors: Emilio Almazán, Alcorcón (ES); Javier Tovar Velasco, Cigales (ES); Alejandro de la Calle, Valladolid (ES)

(73) Assignee: The Nielsen Company (US), LLC, New York, NY (US)

( * ) Notice: Subject to any disclaimer, the term of this patent is extended or adjusted under 35 U.S.C. 154(b) by 390 days.

(21) Appl. No.: 16/860,947

(22) Filed: Apr. 28, 2020

(65) Prior Publication Data

US 2020/0410320 A1 Dec. 31, 2020

Related U.S. Application Data

(60) Provisional application No. 62/867,757, filed on Jun. 27, 2019.

(51) Int. Cl.
*G06N 3/04* (2023.01)
*G06N 3/084* (2023.01)
(Continued)

(52) U.S. Cl.
CPC .............. *G06N 3/084* (2013.01); *G06F 17/16* (2013.01); *G06N 3/04* (2013.01); *G06N 3/08* (2013.01);
(Continued)

(58) Field of Classification Search
CPC ..... B29C 48/001; G06F 17/16; G06F 16/337; G06F 16/38; G06F 16/951; G06F 40/232;
(Continued)

(56) References Cited

U.S. PATENT DOCUMENTS 6,173,252 B1 * 1/2001 Qiu ..................... G06F 40/232
715/260
7,275,052 B2 * 9/2007 Peh ......................... G06F 16/38
707/999.005

(Continued)

OTHER PUBLICATIONS

Ioffe, Sergey et al., "Batch Normalization: Accelerating Deep Network Training by Reducing Internal Covariate Shift", ICML'15: Proceedings of the 32nd International Conference on International Conference on Machine Learning, vol. 37, Jul. 2015, 12 pages.
(Continued)

*Primary Examiner* — Gerald Gauthier
(74) *Attorney, Agent, or Firm* — Hanley, Flight & Zimmerman, LLC

(57) ABSTRACT

Example methods disclosed herein to initialize classification vectors of a neural network include ranking a plurality of classes to be represented by the classification vectors based on respective numbers of instances of training data associated with corresponding ones of the classes. Disclosed example methods also include initializing the classification vectors to span a classification space corresponding to the classes. Disclosed example methods further include assigning respective ones of the classes to corresponding ones of the classification vectors based on the ranking of the classes.

16 Claims, 9 Drawing Sheets

(51) Int. Cl.
*G06N 3/08* (2023.01)
*G06F 17/16* (2006.01)
*G06V 10/764* (2022.01)
*G06V 10/82* (2022.01)
*G06V 10/44* (2022.01)

(52) U.S. Cl.
CPC .......... *G06V 10/454* (2022.01); *G06V 10/764* (2022.01); *G06V 10/82* (2022.01)

(58) Field of Classification Search
CPC ...... G06F 40/53; G06F 1/3231; G06F 3/0608; G06F 16/93; G06F 18/214; G06F 18/2148; G06F 18/24; G06K 9/6267; G06K 9/6271; G06K 9/628; G06K 9/6284; G06N 3/02; G06N 3/04; G06N 3/0454; G06N 3/08; G06N 3/082; G06N 3/084; G06N 3/088; G06N 20/00; G06N 3/0427; G06N 20/10; G06N 3/044; G06N 3/045; G06N 7/01; G06N 20/20; G06V 10/454; G06V 10/82; G06V 10/95; G06V 10/764; G06V 10/774; G06V 10/776; G06V 10/751; G06V 20/38; H04L 63/1425; C08L 23/06; G06Q 30/0282
USPC .............................................. 382/157; 706/20
See application file for complete search history.

(56) References Cited

U.S. PATENT DOCUMENTS

| | | | | |
|---|---|---|---|---|
| 8,156,056 | B2* | 4/2012 | Luege Mateos | G06F 16/337 706/20 |
| 10,664,722 | B1* | 5/2020 | Sharma | G06V 10/776 |
| 10,956,712 | B1* | 3/2021 | Picardo | G06T 7/74 |
| 11,244,363 | B1* | 2/2022 | Garrity | G06Q 30/0282 |
| 2003/0221166 | A1* | 11/2003 | Farahat | G06F 16/951 707/E17.09 |
| 2013/0332401 | A1* | 12/2013 | Muraoka | B29C 48/001 706/20 |
| 2015/0039543 | A1* | 2/2015 | Athmanathan | H04L 63/1425 706/20 |
| 2016/0180200 | A1* | 6/2016 | Vijayanarasimhan | G06N 3/082 706/20 |
| 2016/0267351 | A1* | 9/2016 | Bober | G06V 10/764 |
| 2017/0061326 | A1* | 3/2017 | Talathi | G06K 9/6267 |
| 2018/0189610 | A1* | 7/2018 | Kandemir | G06V 10/774 |
| 2018/0349388 | A1* | 12/2018 | Skiles | G06N 3/08 |
| 2019/0095432 | A1* | 3/2019 | Xia | G06F 40/53 |
| 2019/0146590 | A1* | 5/2019 | Chiang | G06N 20/00 706/20 |
| 2019/0311258 | A1* | 10/2019 | Zhang | G06N 3/08 |
| 2019/0384525 | A1* | 12/2019 | Danilov | G06F 3/0608 |
| 2020/0104630 | A1* | 4/2020 | Chen | G06N 20/10 |
| 2020/0134376 | A1* | 4/2020 | Sallee | G06N 3/0427 |
| 2020/0134398 | A1* | 4/2020 | Kruk | G06N 20/20 |
| 2020/0324407 | A1* | 10/2020 | Rajkumar | G06N 3/0454 |
| 2020/0327445 | A1* | 10/2020 | Yu | G06N 20/00 |
| 2020/0410320 | A1* | 12/2020 | Almazán | G06V 10/454 |
| 2021/0125108 | A1* | 4/2021 | Metzler, Jr. | G06F 16/93 |

OTHER PUBLICATIONS

He, Kaiming et al., "Deep Residual Learning for Image Recognition", published in 2016 IEEE Conference on Computer Vision and Pattern Recognition (CVPR), Jun. 27-30, 2016, 14 pages.

He, Kaiming et al., "Delving Deep into Rectifiers: Surpassing Human-Level Performance on ImageNet Classification", ICCV '15: Proceedings of the 2015 IEEE International Conference on Computer Vision (ICCV), Dec. 7-13, 2015, 12 pages.

Hayat, Munawar et al., "Gaussian Affinity for Max-Margin Class Imbalanced Learning", published in 2019 IEEE/CVF International Conference on Computer Vision (ICCV), Sep. 2019, 12 pages.

Pernici, Federico et al., "Maximally Compact and Separated Features with Regular Polytope Networks", The IEEE Conference on Computer Vision and Pattern Recognition (CVPR) Workshops, 2019, pp. 46-53, 9 pages.

Glorot, Xavier et al., "Understanding the Difficulty of Training Deep Feedforward Neural Networks", Proceedings of the Thirteenth International Conference on Artificial Intelligence and Statistics, 2010, pp. 249-256, 8 pages.

De La Calle, Alejandro et al., "Geometric interpretation of a CNN's last layer", Proceedings of the IEEE/CVF Conference on Computer Vision and Pattern Recognition (CVPR) Workshops, 2019, pp. 79-82, 4 pages.

* cited by examiner

INITIALIZATION OF CLASSIFICATION LAYERS IN NEURAL NETWORKS

RELATED APPLICATION(S)

This patent claims the benefit of U.S. Provisional Patent Application Ser. No. 62/867,757, which was filed on Jun. 27, 2019. U.S. Provisional Patent Application Ser. No. 62/867,757 is hereby incorporated herein by reference in its entirety. Priority to U.S. Provisional Patent Application Ser. No. 62/867,757 is hereby claimed.

FIELD OF THE DISCLOSURE

This disclosure relates generally to neural networks and, more particularly, to initialization of classification layers in neural networks.

BACKGROUND

A neural network typically includes multiple layers of nodes, which include an input layer, one or more intermediate layers, and an output layer of the neural network, also referred to as the classification layer of the neural network. The training of the neural network typically includes varying the node weights in the layers of the neural network to meet a classification performance target. Some neural network initialization techniques focus on maintaining the magnitudes of the weights of the layers within a target range, which helps ensure convergence of the neural network.

BRIEF DESCRIPTION OF THE DRAWINGS

The figures are not to scale. In general, the same reference numbers will be used throughout the drawing(s) and accompanying written description to refer to the same or like parts, elements, etc.

Figure 1:
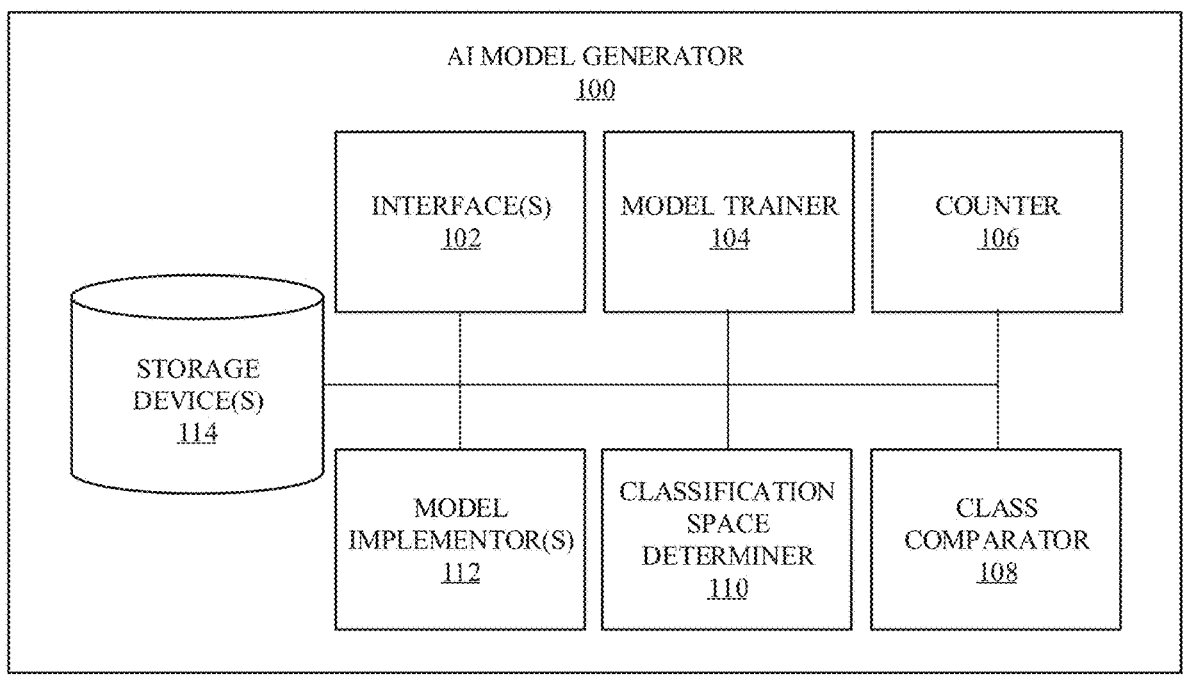
FIG. 1 is a block diagram illustrating an example artificial intelligence (AI) model generator implemented in accordance with teachings of this disclosure.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example technical solutions to initialize classification layers in neural networks are disclosed. Such example technical solutions may include one or more methods, apparatus, systems, articles of manufacture (e.g., physical storage media), etc., to initialize classification layers in neural networks in accordance with teachings of this disclosure.

As noted above, a neural network typically includes multiple layers of nodes, which include an input layer, one or more intermediate layers, and an output layer of the neural network, also referred to as the classification layer of the neural network. The training of the neural network includes varying the node weights in the layers of the neural network to meet a classification performance target. Prior neural network initialization techniques focus on maintaining the magnitudes of the weights of the layers within a target range, which helps ensure convergence of the neural network.

However, prior neural network initialization techniques do not consider the distribution of the weights of the classification vectors included in the classification layer. For example, the training process can be interpreted as a competition in which the different classification vectors work to cover as large an area as possible in the classification space. However, during the training of conventional neural networks, if two adjacent classification vectors have a substantial difference in the number of training samples that are available (e.g., unbalanced data sets), the area corresponding to the classification vector with more training samples tends to overcome (e.g., bias) the area corresponding to the other classification vector. Examples disclosed herein reduce the bias by choosing an initial directions of the classification vectors and their neighbor vectors to give a more even opportunity between classifications with large numbers of training samples and classifications with small numbers of training samples. As used herein, an unbalanced dataset is a dataset that includes substantially more training samples of one or more categories of the dataset than training samples of one or more other categories of the dataset. As used herein, training samples, training data, and/or training instances refer to labelled data that is used to train an AI model.

Examples disclosed herein initialize classification layers in neural networks to reduce classification bias for unbalanced datasets. Disclosed example technical solutions ensure fair competition between classification vectors in the classification layer by placing classification vectors with similar numbers of training samples near each other in the classification space. Some disclosed example classification layer initialization solutions are able to yield an 18% improvement in classification accuracy over prior initialization techniques when classifying entries from the Mixed National Institute of Standards and Technology (MNIST) public database of handwritten digits dataset. Because training has a random component that affects the initial value of the parameters and the order in which the training samples are feed into the network, the randomness results in some amount of variability in the final output over several runs. However, examples disclosed herein are also able to yield a 12%, reduction, relative to prior techniques. Further implementation details for disclosed example technical solutions to initialize classification layers in neural networks are provided below.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. In general, machine learning models/architectures that are suitable to use with the example approaches disclosed herein include be neural network based models (e.g., convolution neural networks (CNNs), deep neural networks (DNNs), etc.). However, other types of machine learning models could additionally or alternatively be used, such as deep learning and/or any other type of AI model.

In general, implementing an ML/AI system involves two phases, a training phase (also referred to as a learning phase) and an inference phase. In the training phase, a training algorithm is used to train a model to operate in accordance with patterns and/or associations based on, for example, training data, also referred to herein as training samples. In general, the model includes internal parameters that guide how input data is transformed into output data, such as through a series of nodes and connections within the model to transform input data into output data. In some examples, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses training samples that include inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using any training algorithm and/or any type of training data. In examples disclosed herein, training is performed until an acceptable amount of error is achieved. Training is performed using hyperparameters that control how the learning is performed (e.g., a learning rate, a number of layers to be used in the machine learning model, etc.). In some examples re-training may be performed. Such re-training may be performed in response to obtaining additional training data, for example.

In some examples, training is performed using training data. Because supervised training is used, the training data is labeled. Labeling is applied to the training data by an audience measurement entity, a server, and/or a human.

Once training is complete, the model is deployed for use as an executable construct that processes an input and provides an output based on the network of nodes and connections defined in the model. The model may be stored locally or remotely. The model may then be executed by a model generator or other device to perform classifications of input data.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what the AI model learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed AI model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is block diagram of an example AI model generator 100. The example AI model generator 100 includes example interface(s) 102, an example model trainer 104, an example counter 106, an example class comparator 108, an example classification space determiner 110, an example model implementor(s) 112, and example storage device(s) 114.

The example network interface(s) 102 of FIG. 1 is/are one or more interfaces(s) to obtain data to be used to train an AI model. For example, the network interfaces(s) 102 may obtain training data from servers via a network. Training data is known data that can be used to help train an AI model. For example, if the AI model generator 100 generates an AI model that, when trained, can determine a type (e.g., class) of animal based on an input image, the training data may be images that include animals where the type of animals in the images are known (e.g., are tagged or otherwise identified with the image). Additionally or alternatively, the example interface(s) 102 may obtain training data from any type of device (e.g., from memory via a wired or wireless connection). The example interface(s) 102 store(s) obtained training data in the example storage device(s) 114. In some examples, the interface(s) 102 may be or include a user interface to obtain instructions from a user and/or other device regarding how to train an AI model. The instructions may include the number of classes that the AI model should classify, the number of layers for the AI model, the size of filters of the AI model, etc. The example interface(s) 102 can be one interface (e.g., to obtain training data and/or user instructions) or can be more than one interface (e.g., a first interface to obtain training data and a second interface to obtain user instructions).

The example model trainer 104 of FIG. 1 trains the models (e.g., AI model(s), neural network(s), machine learning model(s), deep learning model(s), convolution neural network(s), another type(s) of AI model(s) and/or network(s)) stored in the example storage device(s) 114. Initially, a model(s) is/are untrained (e.g., the neurons are randomly weighted). The example model trainer 104 of FIG. 2 trains one or more models based on known (e.g. validated) training data that includes input data (e.g., images) and known output data (e.g., classification(s) for the images). The example model trainer 104 initializes the training of an AI model by creating a skeleton model corresponding to AI-model parameters. In some examples, the skeleton model includes one or more of a number of layers, a size of filters, the number and/or type of classes for classification, the number of dimensions of the classification layer (e.g., the output layer) of the AI model, etc. The AI-model parameters may be preset and/or may be based on user instructions (e.g., obtained from the example interface(s) 102). The example model trainer 104 initializes the AI model to include a feature extractor portion and a classifier portion. The feature extractor portion extracts features from input data that are used to classify the input data. The outputs of the feature extractor are embedding vectors that can be mapped in a classification space defined by the AI model. The classifier classifies the input data based on the embedding vectors and their respective locations within the classification space. An example of an AI model is further described below in conjunction with FIG. 4. After the example model trainer 104 initializes the AI model, the example counter 106, the example class comparator 108, and the example classification space determiner 110 initialize the parameters of the classification layer (e.g., also referred to as the classification layer, the classification vectors, etc.) of the AI model by defining the classification space as described below.

The example counter 106 of FIG. 1 counts the number of training samples, also referred to as training instances, for the classes of the AI model. As described above, the training instances are stored in the example storage device(s) 114. The training instances correspond to input data (e.g., images) that have known classifications corresponding to a class. For example, if there are 52 training instances that are images of alpacas that are known to be alpacas (e.g., tagged and/or previously classified as alpacas), 6,300 training instances that are images of cats that are known to be cats, 723 training instances that are images of octopuses that are known to be octopuses, and 5,000 training instances that are images of dogs that are known to be dogs in the example storage device(s) 144, the example counter 106 determines that there are 52 training instances for the alpaca class, 6,300 training instances of the cat class, 723 training instances of the octopuses, and 5,000 training instances for the dog class.

The example class comparator 108 of FIG. 1 ranks (e.g., organizes, sorts, orders, etc.) the classes of the AI model based on the number of training instances (e.g., in increasing or decreasing order). Using the above example, the class comparator 108 ranks the animal classes as cat class, dog class, octopus class, and alpaca class. In some examples, the class comparator 108 may group classes that have a similar number of training instances (e.g., within a threshold number) and rank the groups.

The example classification space determiner 110 of FIG. 1 defines the classification space by initializing the classification vectors and/or areas corresponding to the classes to be substantially equally distant and/or substantially equal in area. In this manner, classes that correspond to a large number of training instances will not dominate classes with a small number of training instances, leading to inaccurate classifications. For example, if the AI model is to be structured to classify 10 different classes, the example classification space determiner 110 may break the classification space up by defining ten vectors spaced substantially equidistant (e.g., within 10%, for example) apart from each other (e.g., every 36 degrees±10%) and/or defines 10 substantially equally sizes classification areas (e.g., 36 degree sectors±10% from the center of the classification space). Once the example classification space determiner 110 determines the classification vectors and/or areas, the example classification space determiner 110 assigns the classes to the defined classification vectors and/or areas based on the number of training instances of the classes. The example classification space determiner 110 assigns classes with similar number of training instances next to and/or near each other to provide a more even opportunity between classifications (e.g., even the playing field for unbalanced training sets). For example, the classification space determiner 110 may select a class from the ranked classes (e.g., a highest or lowest ranked class) and assign to a first classification vector and/or area. After the first class is assigned, the example classification space determiner 110 selects a subsequent class (e.g., a next highest or lowest ranked class) and assigns to a classification vector and/or area neighboring the vector and/or area of the previous highest or lowest ranked assigned class. In this manner, when all classes are assigned to vector and/or areas, the classes will be neighboring similarly ranked (e.g., based on number of instances) classes to avoid classification errors cause by classes with large numbers of training instances. The trained AI model with the defined classification space is stored in the example storage device(s) 114.

After a model is trained based on the defined classification space, the example model implementor(s) 112 of FIG. 1 obtains input data and, using the trained model, outputs corresponding classification. In some examples, the model implementor(s) 112 are multiple implementers utilizing different models trained for different training instances for different classes. For example, there may be a first model implementor 112 to utilize a first model to classify images of animals and a second model implementor 112 to utilize a second model to classify images of vehicles. In some examples, the model implementor(s) 112 is a single model implementor that is capable of implementing multiple models stored in the storage device(s) 114.

The example storage device(s) 114 of FIG. 1 store(s) the training instances. Additionally, the example storage device(s) 114 may store trained models. The example storage device(s) 114 may be separate storage devices (e.g., one for models and one for training instances), may be a single storage device (e.g., for the models and training instances), and/or any combination thereof.

While an example manner of implementing the AI mode generator 100 of FIG. 1 is illustrated in FIG. 1, one or more of the elements, processes and/or devices illustrated in FIG. 1 may be combined, divided, re-arranged, omitted, eliminated and/or implemented in any other way. Further, the example interface(s) 102, the example model trainer 104, the example counter 106, the example class comparator 108, the example classification space determiner 110, the example model implementor(s) 112, the example storage device(s) 114, and/or, more generally, the example AI model generator 100 of FIG. 1 may be implemented by hardware, software, firmware and/or any combination of hardware, software and/or firmware. Thus, for example, any of the example interface(s) 102, the example model trainer 104, the example counter 106, the example class comparator 108, the example classification space determiner 110, the example model implementor(s) 112, the example storage device(s) 114, and/or, more generally, the example AI model generator 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface(s) 102, the example model trainer 104, the example counter 106, the example class comparator 108, the example classification space determiner 110, the example model implementor(s) 112, the example storage device(s) 114, and/or, more generally, the example AI model generator 100 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AI model generator 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
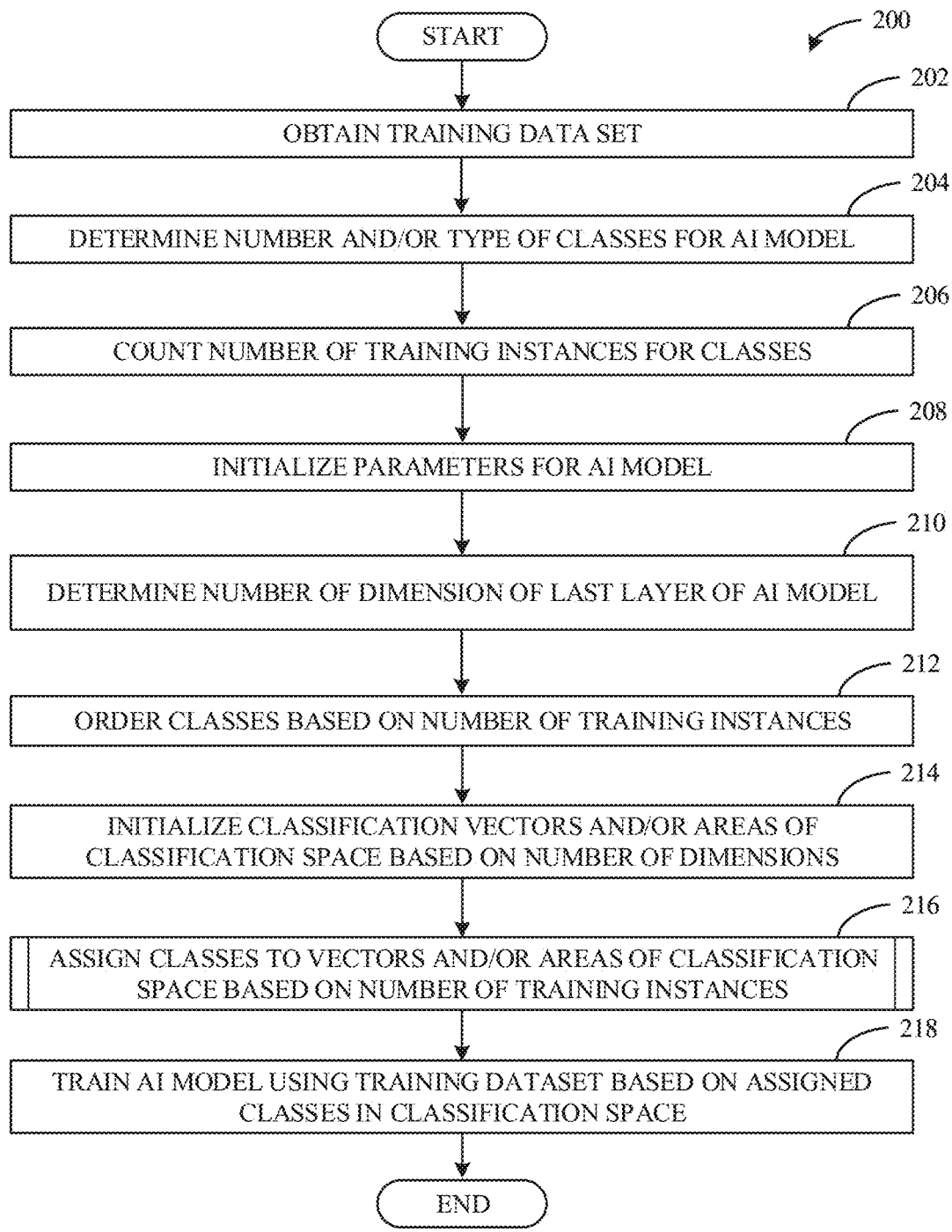
FIGS. 2-3 are flowcharts representative of example computer readable instructions that may be executed to implement the AI model generator of FIG. 1 to initialize classification vectors of an AI model.
Figure 3:
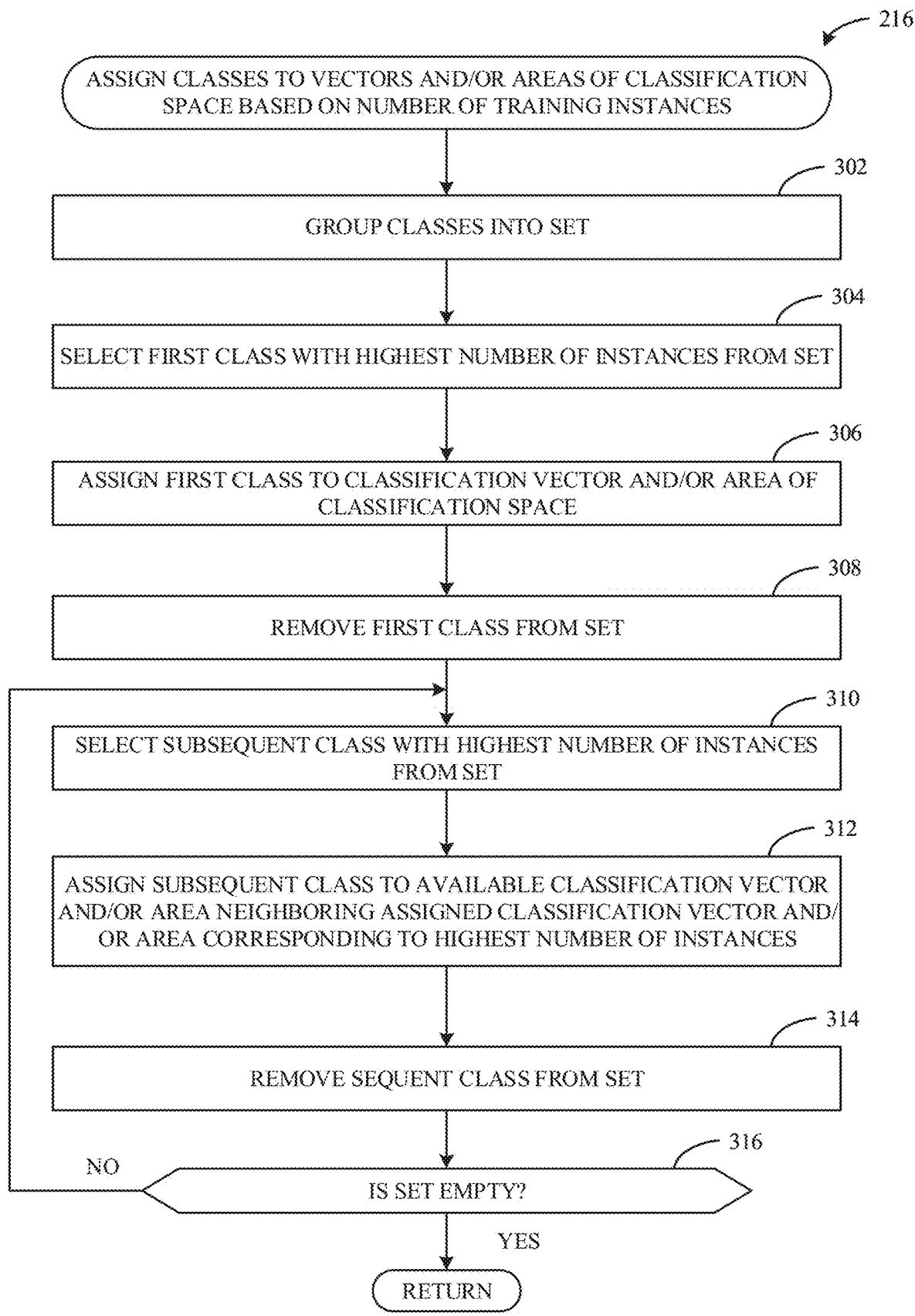

Flowcharts representative of example hardware logic, machine readable instructions, hardware implemented state machines, and/or any combination thereof for implementing the AI model generator 100 of FIG. 1 are shown in FIGS. 2-3. The machine readable instructions may be one or more executable programs or portion(s) of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 2-3, many other methods of implementing the example AI model generator 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 2-3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open-ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 is an example flowchart representative of example machine readable instructions 200 that may be executed by the example AI model generator 100 of FIG. 1 to train an AI model. Although the instructions of FIG. 2 are described in conjunction with the example AI model generator 100 of FIG. 1, the example instructions may be utilized to train any type of AI model using any type of AI model generator.

At block 202, the example model trainer 104 obtains a training data set from the example storage device(s) 114 and/or the example interface(s) 102. The training data set includes training instances that correspond to different classes used to train an AI model. In some examples, the model trainer 104 obtains the training data set from the storage device 114. In other examples, the model trainer 104 receives the training data set from another device via the interface(s) 102. At block 204, the interface(s) 102 determine(s) the number and/or type of classes for the AI model. The number and/or type of classes corresponding to the AI model may be preset and/or based on user and/or manufacturer input preferences, etc.

At block 206, the example counter 106 counts the numbers of training instances for respective ones of the classes based on the obtained training data. For example, if the training data set includes 325 training instances corresponding to a first class and 321 training instances corresponding to a second class, the counter 106 counts the instances to determine the 325 instances for the first class and the 312 instances of the second class. At block 208, the example model trainer 104 initializes AI parameters for the AI model. For example, the example model trainer 104 may determine a number of layers, a size of filters, the number and/or type of classes for classification, the number of dimensions of the classification layer of the AI model, etc. to generate an initial skeleton of the AI model. The AI parameters may be preset and/or may be based on instructions from a user and/or device (e.g., obtained via the example interface(s) 102).

At block 210, the example model trainer 104 determines the number of dimensions of the classification layer of the AI model. The example model trainer 104 may determine the number of dimensions of the classification layer based on the number of classes. For example, if the AI model is to classify images into six classes, the model trainer 104 may determine the number of dimensions of the classification layer to be six. At block 212, the example class comparator 108 orders the classes based on the number of training instances of the classes. For example, the class comparator 108 orders the classes in increasing or decreasing order based on the number of training instances of the classes. As further described below, classes are assigned to classification vectors and/or areas based on the number of training instances to provide a more even opportunity between classifications.

At block 214, the example classification space determiner 110 initializes the classification vectors and/or areas of the classification space defined by the classification layer based on the number of dimensions of the classification layer (e.g., the number of classes). For example, if there are six dimensions in the classification layer of the model (e.g., six classes), the example classification space determiner 110 generates six classification vectors and/or areas that are spread out substantially equally and/or that include a substantially similar area, as described above in conjunction with FIG. 1. At block 216, the example classification space determiner 110 assigns the classes to the vectors and/or areas of the classification space based on the number of training instances of the classes, as further described below in conjunction with FIG. 3. At block 218, the example model trainer 104 trains the AI model using the training dataset based on the assigned classes in the classification space. Once complete, the model trainer 104 stores the model in the example storage device(s) 114. In this manner, the model implementor(s) 112 can utilize the example AI model to take an input and classify the input by generating an output identifying one or more of the classifications.

FIG. 3 is an example flowchart representative of example machine readable instructions 216 that may be executed by the example AI model generator 100 of FIG. 1 to assign classes to vector and/or areas of the classification space based on the number of training instances, as described above in conjunction with block 216 of FIG. 2. Although the instructions of FIG. 3 are described in conjunction with the example AI model generator 100 of FIG. 1, the example instructions may be utilized to train any type of AI model using any type of AI model generator.

At block 302, the example classification space determiner 110 groups the classes into a set. For example, if the training data set includes images corresponding to three classes (e.g., images of wolves, dogs, and coyotes), the AI model may be trained to identify the three classes and the example classification space determiner 110 groups the three classes into a set. At block 304, the example classification space determiner 110 selects a first class with the highest number of training instances from the set. In some examples, the classification space determiner 110 may select the first class with the lowest number of instances from the set and work to the highest.

At block 306, the example classification space determiner 110 assigns the selected first class to a classification vector and/or area of the classification space. At block 308, the example classification space determiner 110 removes the first class from the set. At block 310, the example classification space determiner 110 selects a subsequent class with the next highest number of training instances from the set. In examples where the lowest number of training instances from the set was first selected, the classification space determiner 110 may select the subsequent class with the next lowest number of instances from the set.

At block 312, the example classification space determiner 110 assigns the selected subsequent class to a classification vector and/or area neighboring the assigned classification vector and/or area corresponding to the highest number of instances. As further illustrated below in conjunction with FIG. 11, a classification vector and/or area may include two neighboring vectors and/or areas (e.g., one located clockwise and one located counter-clockwise). If the vector corresponding to the highest number of instances has an open neighbor, the example classification space determiner 110 assigns the subsequent class to the open neighbor. If the vector corresponding to the highest number of instances does not have an open neighbor, the example classification space determiner 110 determines which vector has been assigned to the class with the highest number of training instances with an open neighbor and assigns the subsequent vector to the open neighbor. In this manner, classes with a low number of training instances are located close together and classes with a high number of training instances are located together to even the playing field for classification.

At block 314, the example classification space determiner 110 removes the subsequent class from the set. At block 316, the example classification space determiner 110 determines if the set is empty (e.g., if all classes have been assigned to vectors and/or areas of the classification space). If the example classification space determiner 110 determines that the set is empty (e.g., all classes have been assigned to vectors and/or areas) (block 316: YES), control returns to block 218 of FIG. 2. If the example classification space determiner 110 determines that the set is not empty (e.g., there is at least one class that has set to be assigned to a vector and/or area) (block 316: NO), control returns to block 310 to continue to assign classes to vectors based on the number of training instances of the classes.

Figure 4:
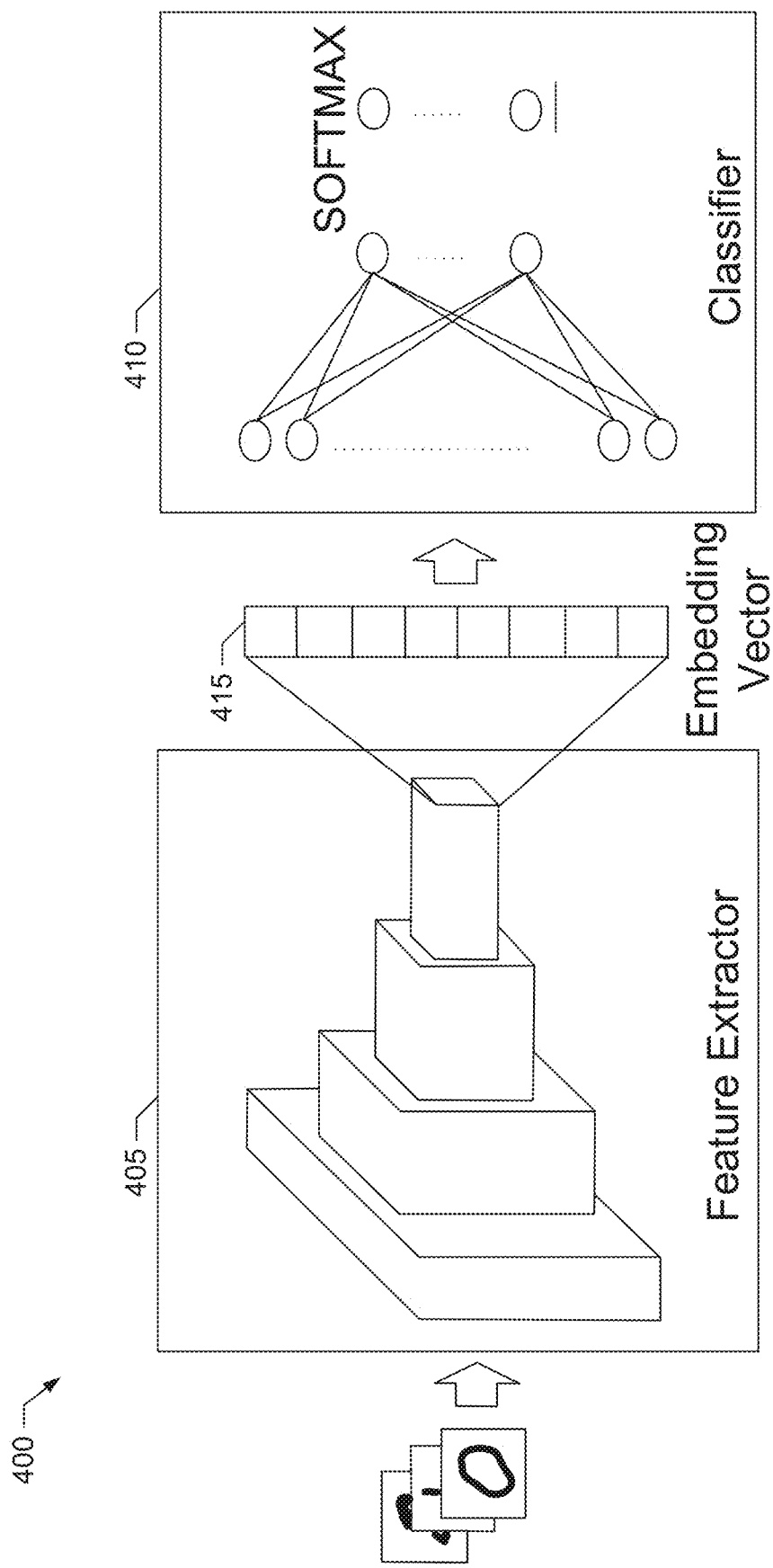
FIG. 4 is a block diagram illustrating an example neural network that may be generated using the AI model generator of FIG. 1.

FIG. 4 illustrates an example neural network 400 that may be generated by the example AI model generator 100 in which initialization of the classification block can be performed in accordance with teachings of this disclosure. The example neural network 400 of FIG. 4 is illustrated as a convolutional neural network (CNN). Alternatively, the neural network 400 may be any type of AI model. The example CNN 400 of FIG. 4 includes an example feature extraction block 405 and an example classification block 410 (also referred to as an example classification layer 410).

Figure 5:
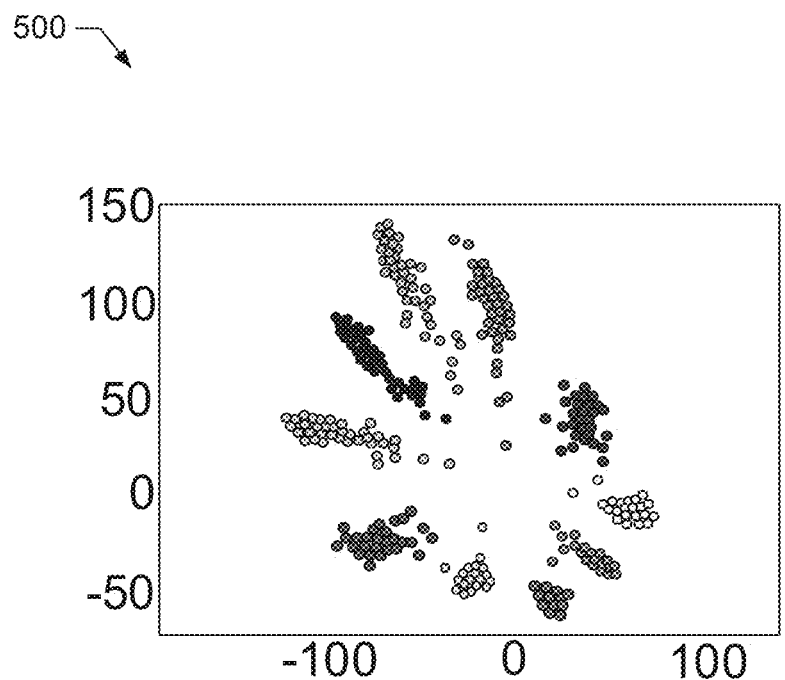
FIG. 5 illustrates example feature vectors determined by the example neural network of FIG. 4 after training.

The feature extraction block 405 of FIG. 4 receives (e.g., obtains) an input data to be classified, such as an input image. The feature extraction block 405 applies a series of convolutions and pooling operations with the goal of identifying discriminative features. The output of the feature extraction block 405 is an example one-dimensional feature vector 415 (e.g., a classification vector) that includes N features representing the input data. As such, the one-dimensional feature vector 415 is also referred to as the feature encoding or feature embedding of the input data. For example, if the input data is an image, the feature vector 415 can be considered to be the image encoding or embedding of the image. If the feature extraction block 405 is well trained using a balanced dataset, encodings for data from the same class should be close together. FIG. 5 illustrates an example of the distribution of these feature embeddings 415 for the case of 10-dimensional feature vectors determined for respective input images. The respective feature vector 415 for each input data (e.g., each input image) is the input to the classification block 410.

The classification block 410 of FIG. 4 receives (e.g., obtains) the embedding vector 415 from the feature extraction block 405 and classifies the embedding vector 415 by calculating the probabilities of the embedding vector 415 belonging respective ones of the possible output classes. In some examples, the classification block 410 classifies the embedding vector 415 into the class having the largest classification probability among the possible output classes. In the illustrated example, during training, the AI model generator 100 trains the CNN 400 to optimize a loss function through back-propagation and gradient descent. One of the most common objective function is the cross-entropy loss, which measures the difference between the predicted distribution f(x) and the target distribution, p(s) (e.g., constructed from ground truth). For example for a given instance, the cross-entropy may be expressed according to Equation 1.

$$L_i = -\Sigma_{c=1}^{C}[p(x^i)]_c \log \log[f(x^i)]_c \qquad \text{(Equation 1)}$$

In the above Equation 1, C is the total number of classes. Equation 1 can also be expressed using geometric notation of the dot product as shown in Equation 2.

$$L_i = -\sum_{c=1}^{C}[p(x^i)]_c \log\log\left[\frac{\exp(\|W_c\|\|x^i\|\cos\theta_c^i)}{\sum_c \exp(\|W_c\|\|x^i\|\cos\theta_c^i)}\right] \qquad \text{(Equation 2)}$$

In the above Equation 2, $\theta_c^i$ is the angle between the image encoding (i) with respect to the classifier vector c. Based on Equation 2, there are two pathways to reduce the loss according to the blocks of the network: by updating the parameters of the backbone (e.g., the feature extraction block), or by updating the parameters of the classifier block. A backbone update includes updating parameters of the convolution filters of the network, eventually leading to different encode vectors. From the geometric perspective, in order to reduce the loss, the network can reduce the angle $\theta_c^i$ by moving the encoding closer to its classifier. A classifier update includes updating the classifier block 410 by updating the classifier's vectors. The training process may yield an increase of $|W_c|$ for the correct class and/or change the direction of the vector, so the angle $\theta_c^i$ of the correct class is reduced. Likewise, it can also reduce the norm of the rest of the classifiers and/or increase their angles with the encoding by changing their directions away from it.

The example AI model generator 100 structures the feature extraction block 405 to update the parameters of the convolutional filters with the goal of reducing the distances between feature vectors 415 from the same class and increasing the distances between feature vectors 415 from different classes. The example AI model generator 100 trains the classification block 410 by updating the classification vectors of the classification block 410. For example, the training process can yield changes in the norm (e.g., magnitude) of the classifier vectors (relative to the origin in the N-dimensional classification space) and/or changes in the direction of the classifier vectors (relative to the origin in the N-dimensional classification space), so the angles between the feature vectors 415 and the correct classification vectors for those feature vectors are reduced.

The classification block 410 of FIG. 4 may be a classifier with a softmax function. A softmax function is a function that obtains a vector of N real numbers, and normalizes the vector into a probability distribution consisting of N probabilities proportional to the exponentials of the input numbers. In some examples, the classification block is composed of several dense layers. In some examples, the classification block may be the last layer, or output layer, or classification layer of a neural network. The classification layer calculates the class probability for the input data. In some examples, the classification layer is a linear classifier that performs the linear transformation given by the below Equation 3.

$$z_c = \Sigma_{j=1}^{N} W_{c,j} x_j + b_c \qquad \text{(Equation 3)}$$

In the above-Equation 3, $W \in \mathbb{R}^{C \times N}$ is the classifier weight matric with C being the number of classes and N the size of the image encoding, $b \in \mathbb{R}^C$ is the bias term, $x \in \mathbb{R}^N$ is the image embedding (e.g., the outcome of the feature extraction block, and $z \in \mathbb{R}^N$ is the prediction class vector.

As described above, the classification block 410 also uses the softmax function, which is a non-linear transformation that produces a probability distribution across all classes. The softmax function is defined as shown in Equation 4.

$$[f(z)]_c = \frac{\exp(z_c)}{\sum_{c=1}^{C} \exp(z_c)} \qquad \text{(Equation 4)}$$

In Equation 4, $[f(z)]_c$ is the probability of the $c^{th}$ class. The performance of the classifier block may be dependent upon the quality of the features. Accordingly, the classifier may benefit from a well separated class-wise features.

Figure 6:
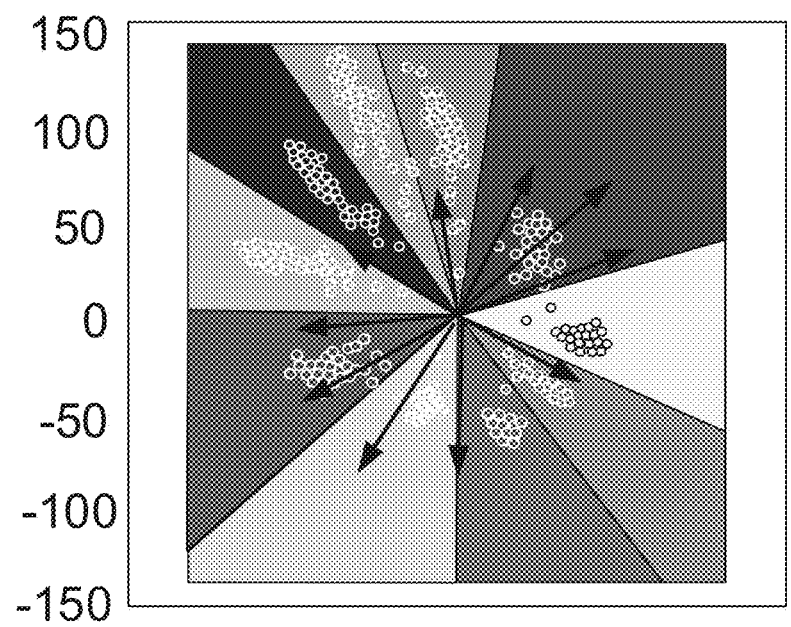
FIG. 6 illustrates example classification vectors determined by the example neural network of FIG. 4 after training.

FIG. 5 illustrates example feature vectors 415 and FIG. 6 illustrates an example classification space 600 including example trained classification vectors and/or areas in the neural network 400 for the feature vectors 415 shown in FIG. 5. In the illustrated example of FIG. 6, each classification vector (represented by a directed line) belongs to a different class. The dots represent the feature vectors 415 that project the input images onto this two-dimensional classification space 600. The different areas shown in the two-dimensional classification space 600 represents the respective area of coverage for each possible class.

Figure 7:
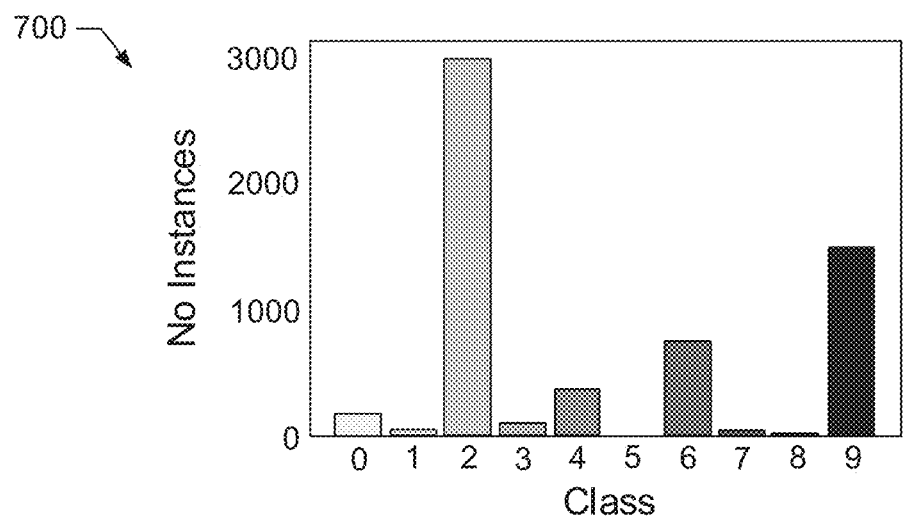
FIGS. 7-9 illustrate example limitations with prior techniques for training neural networks.
Figure 8:
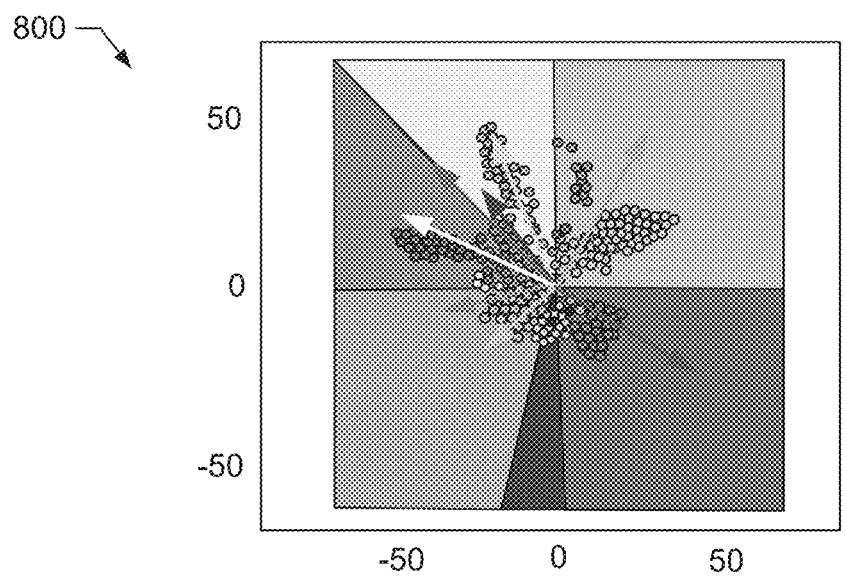
Figure 9:
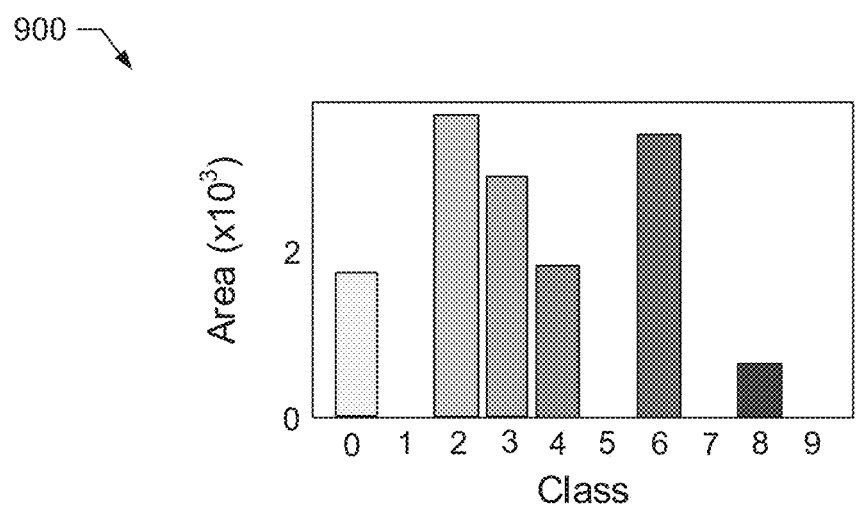

FIGS. 7-9 illustrate example limitations with prior techniques for training neural networks caused by an unbalanced dataset, represented by an example unbalanced dataset graph 700. The coverage area of each classification vector depends not only on the direction and norm of that classification vector, but also depends on the directions and norms of neighboring (e.g., adjacent) classification vectors. For example, the graph 700 of FIG. 7 corresponds to an example dataset with 10 possible classes and illustrates an example distribution of the numbers of training instances per possible class. As shown in the graph 700, in the unbalanced dataset there are about 3,000 training instances for class 2 but less than 100 training instances for classes 1 and 3. Additionally, there are about 800 instances of class 6 and about 1,500 instances of class 9 but very few instances for classes 5, 7, and 8.

FIG. 8 illustrates an example classification space 800 including example classification vectors and corresponding classification areas for the different classes of FIG. 7 that result from a prior neural network training technique. In the example classification space 800 of FIG. 8, the classification areas corresponding to classes 2, 6, and 9 dominate the classification areas of adjacent classifiers. This occurs when a given class has more presence in training data than its neighbors (e.g., an unbalanced training set), the effect of training on the classification layer is to increase the norm of the classification vector for that class, thereby increasing its classification area. Accordingly, the classification areas for classes 1, 5, 7, and 9 are nearly non-existent, as illustrated in FIG. 9.

FIG. 9 illustrates an example graph 900 displaying the sizes of the respective classification areas for the corresponding classification vectors shown in FIG. 8. As shown in the graph 900 of FIG. 9, after the prior training techniques, classes 1, 5, 7, and 9 in the training set end up with little to no classification area. Thus, the trained model will almost always misclassify input images that should be classified as class 1, 5, 7, and/or 9, thereby resulting in an inaccurate AI model.

Figure 10:
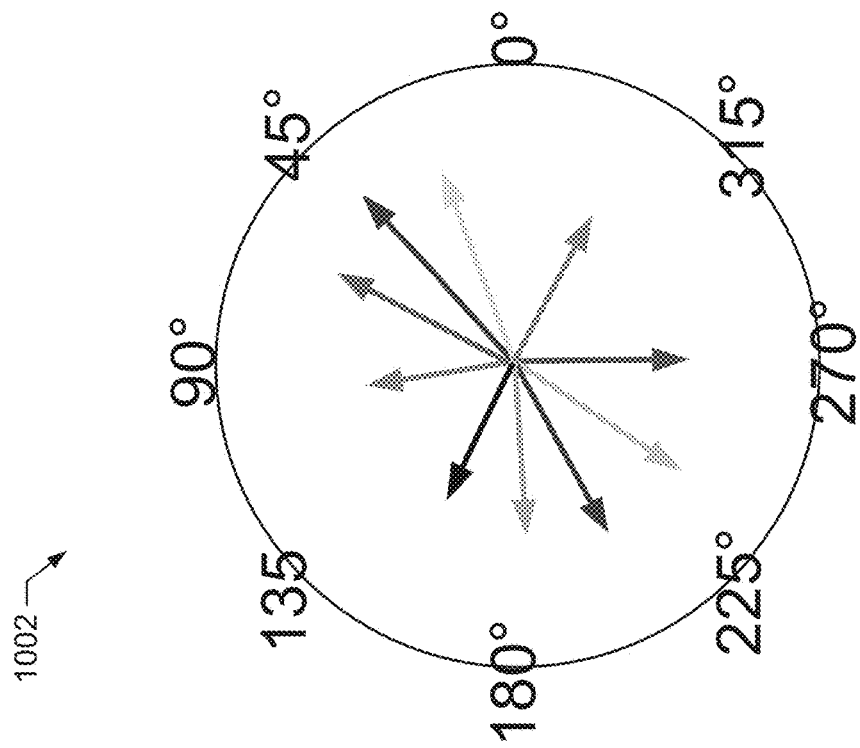
FIG. 10 illustrates and example of how training affects the locations of the classification vectors relative to each other.
Figure 10:
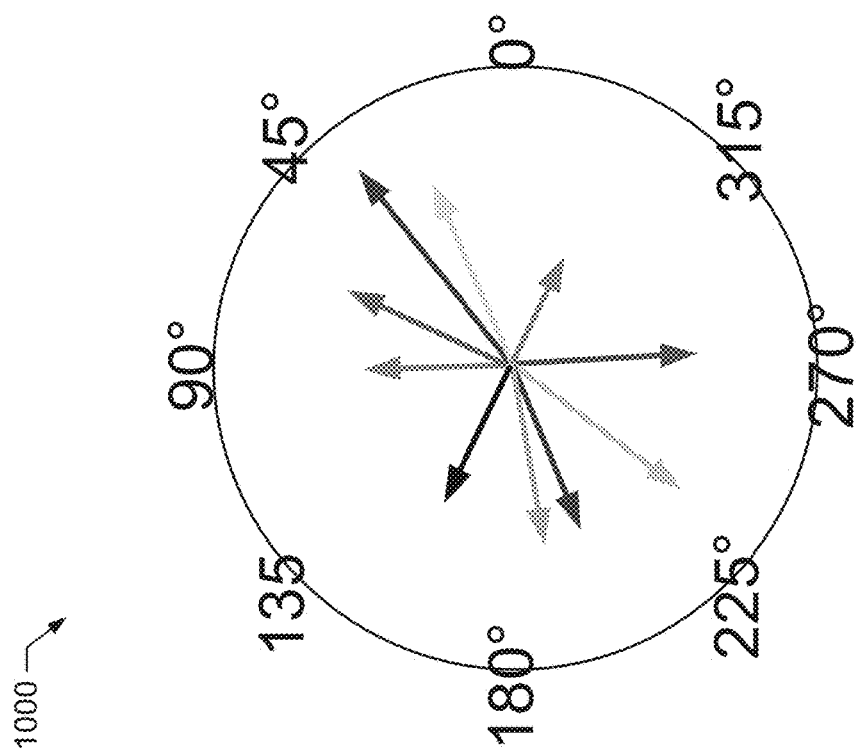

FIG. 10 illustrates how training has little effect on the locations of the classification vectors relative to each other. For example, the relative locations of the classification vectors 1000 at initialization (e.g., iteration 0) is similar to the relative locations of the classification vectors 1002 after training is complete (e.g., iteration 35025). Thus, FIG. 10 illustrates that proper initialization of the relative locations of the classification vectors in the classification space, as is accomplished by example technical solutions disclosed herein, can impact the classification performance of the trained neural network.

Figure 11:
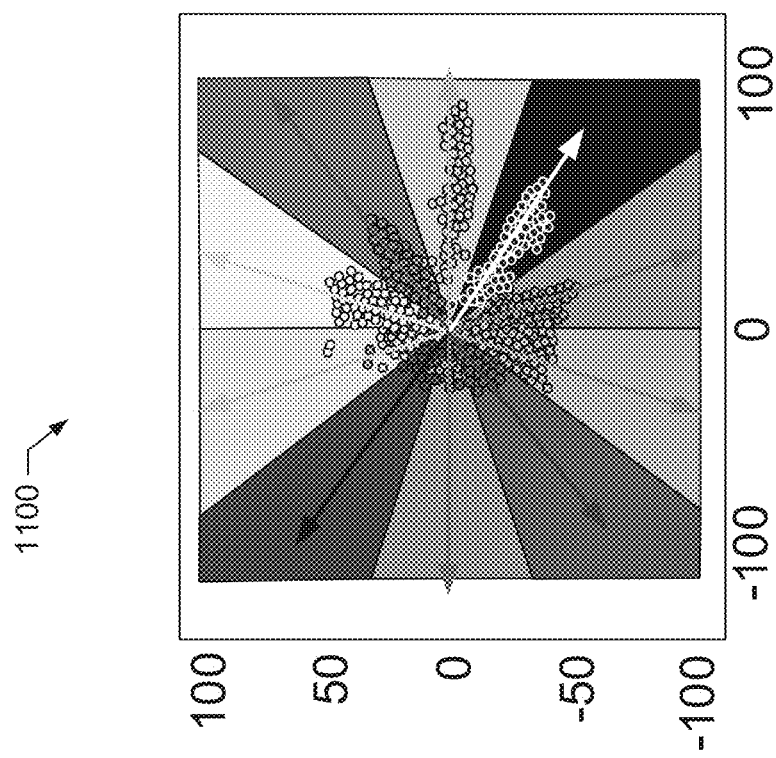
FIG. 11 illustrates example trained classification vectors and corresponding classification spaces achieved by initialization of the classification layer of the example neural network of FIG. 1 in accordance with teachings of this disclosure.
Figure 11:
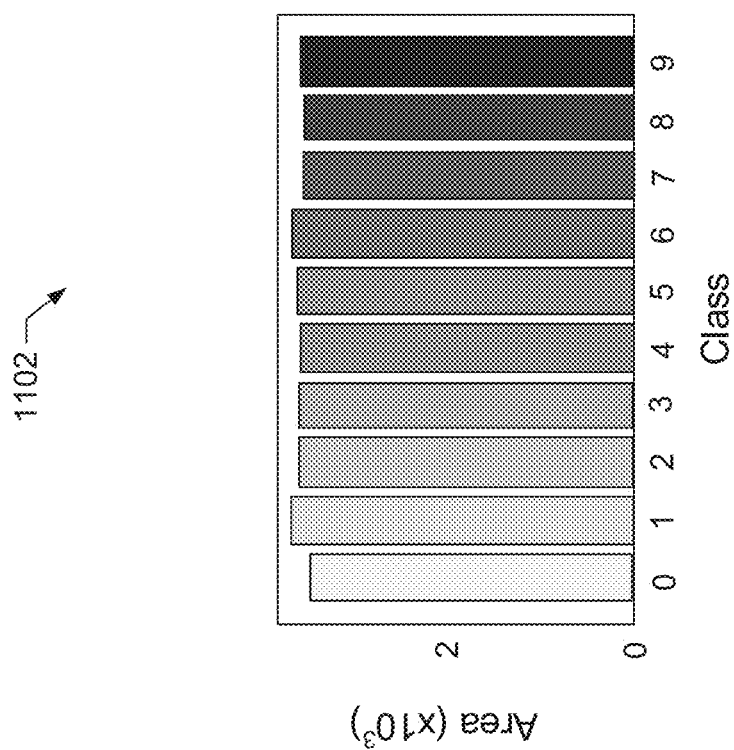

FIG. 11 illustrates example trained classification vectors and corresponding classification spaces determined by the example AI model generator 100 of FIG. 1 based on the unbalanced dataset represented in graph 700 of FIG. 7. FIG. 7 includes the example classification space 1100 and a graph of the areas corresponding to the ten classes of the unbalanced dataset represented in graph 700. The example classification space 1100 is achieved by initialization of the classification layer 410 of the example neural network 400 of FIG. 4 in accordance with teachings of this disclosure.

Initialization of the classification layer of a neural network, such as the classification layer 410 of the neural network 400, as disclosed herein using the AI generator 100 of FIG. 1 initializes the classification vectors of the classification layer to: (i) make the most of the classification space by initially locating the classification vectors equally separated to cover the entire classification space, and (ii) assign the classification vectors in a way that neighbor vectors have similar presence in training data set, thereby helping to ensure fair competition among the classification vectors during training. Resulting trained classification vectors and corresponding classification areas in the classification space 1100 achieved for the example dataset of FIG. 7 by training the neural network with classification layer initialization as disclosed herein is illustrated in FIG. 11. As shown in the graph 1102, the trained classification vectors have corresponding classification areas with relatively similar sizes, as opposed to the graph 900 of FIG. 9, which achieves an 18% improvement in classification accuracy and 12% reduction in variability relative to prior training techniques.

Figure 12:
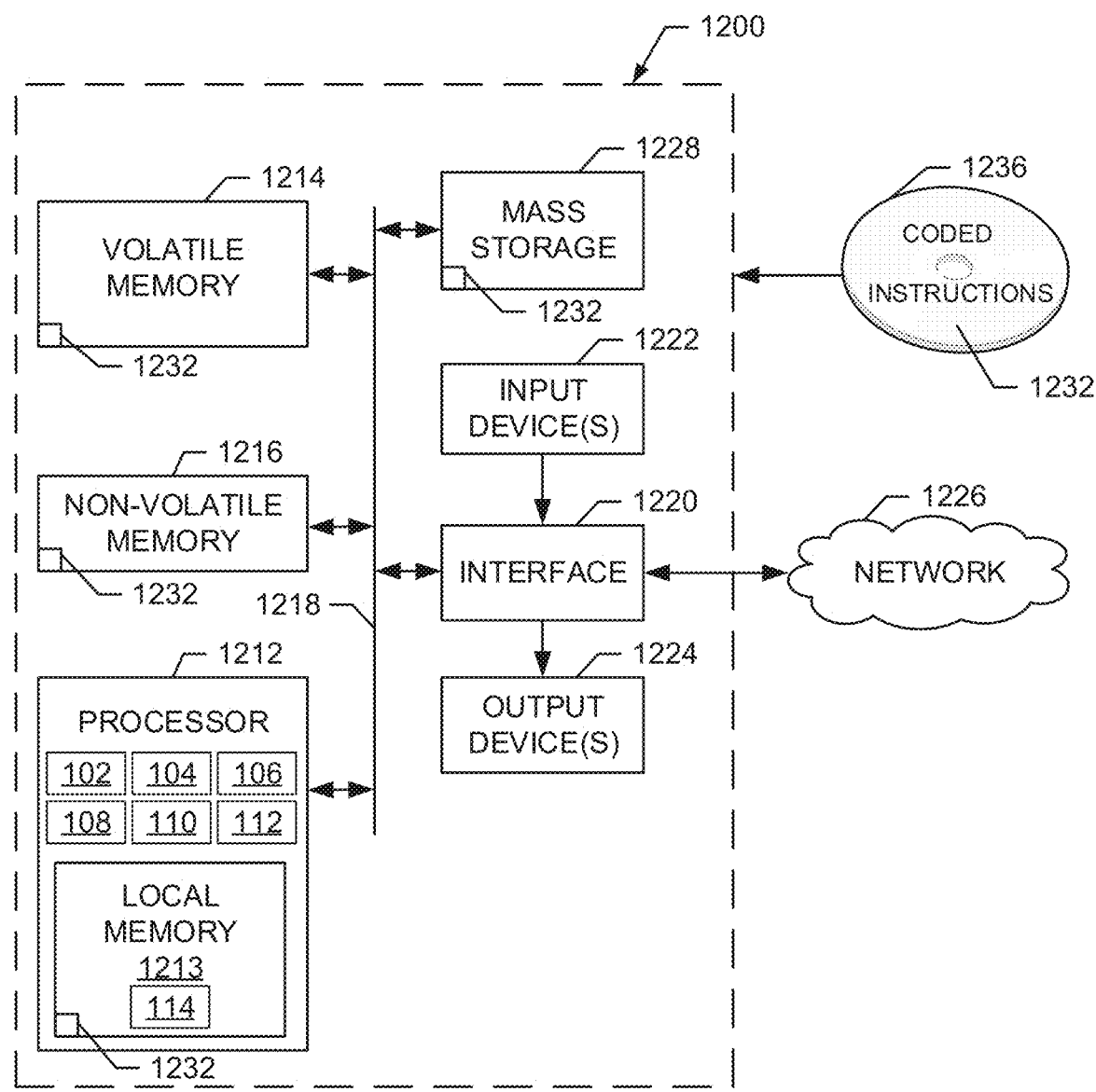
FIG. 12 is a block diagram of an example processor platform structured to execute the example instructions of FIGS. 2-3 to implement the example AI model generator of FIG. 1.

FIG. 12 is a block diagram of an example processor platform 1200 structured to execute the instructions of FIGS. 2-3 to implement the AI model generator 100 of FIG.

1. The processor platform 1200 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor 1212 may be a semiconductor based (e.g., silicon based) device. In FIG. 12, the example processor 1212 implements the example interface(s) 102, the example model trainer 104, the example counter 106, the example class comparator 108, the example classification space determiner 110, and the example model implementor(s) 112.

The processor 1212 of the illustrated example includes a local memory 1213 (e.g., a cache). In FIG. 12, the example local memory 1213 implements the example storage device(s) 114. The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 corresponding to the instructions of FIGS. 2-3 may be stored in the mass storage device 1228, in the volatile memory 1214, in the non-volatile memory 1216, in the local memory 1213 and/or on a removable non-transitory computer readable storage medium, such as a CD or DVD 1236.

From the foregoing, it will be appreciated that example technical solutions to initialize classification layers in neural networks have been disclosed. Disclosed examples improve the efficiency of a computer implementing a neural network by setting the initial state of classification vectors such that the competition for the classification area happens between classes with similar numbers of training instances. As a result, disclosed example classification layer initialization solutions reduce the risk of absent areas for classes with less presence in training time. Moreover, disclosed example classification layer initialization solutions can yield accuracies 18% higher on average relative to prior techniques, suggesting that disclosed example classification layer initialization solutions set more robust initial states that lead with more frequency to good local minima than prior initialization techniques. Disclosed examples are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A tangible computer readable storage medium comprising instructions which, when executed, cause one or more processors to at least:
   rank a plurality of classes to be represented by classification vectors based on respective numbers of instances of training data associated with corresponding ones of the classes, the classification vectors to define classification areas in a classification space corresponding to the classes;
   initialize the classification vectors to be angled substantially equidistant from each other or to define the classification areas to be substantially equal in size, the classification vectors to span the classification space; and
   assign respective ones of the classes to corresponding ones of the classification vectors based on the ranking of the classes.

2. The computer readable storage medium of claim 1, wherein the instructions cause the one or more processors to train an artificial intelligence model based on the assignment of the classes to the classification vectors.

3. The computer readable storage medium of claim 2, wherein the artificial intelligence model is a neural network.

4. A tangible computer readable storage medium comprising instructions which, when executed, cause one or more processors to at least:
rank a plurality of classes to be represented by classification vectors based on respective numbers of instances of training data associated with corresponding ones of the classes, the rank of the plurality of classes to be in order from a highest number of instances of the training data to a lowest number of the instances for the training data or from the lowest number of the instances of the training data to the highest number of the instances of the training data;
initialize the classification vectors to span a classification space corresponding to the classes; and
assign respective ones of the classes to corresponding ones of the classification vectors based on the ranking of the classes by:
selecting a first class of the classes, the first class corresponding to a first number of training instances;
assigning the first class to a first classification vector;
selecting a second class of the classes, the second class being ranked consecutively relative to the first class; and
assigning the second class to a second classification vector neighboring the first classification vector.

5. A tangible computer readable storage medium comprising instructions which, when executed, cause one or more processors to at least:
rank a plurality of classes to be represented by classification vectors based on respective numbers of instances of training data associated with corresponding ones of the classes, the rank of the plurality of classes to be in order from a highest number of instances of the training data to a lowest number of the instances for the training data or from the lowest number of the instances of the training data to the highest number of the instances of the training data;
initialize the classification vectors to span a classification space corresponding to the classes; and
assign respective ones of the classes to corresponding ones of the classification vectors based on the ranking of the classes to ensure a first class with a low rank does not neighbor a second class with a high rank of training instances.

6. An apparatus comprising:
a comparator to rank a plurality of classes to be represented by classification vectors based on respective numbers of instances of training data associated with corresponding ones of the classes, the classification vectors defining classification areas in a classification space corresponding to the classes; and
a classification space determiner to:
initialize the classification vectors to be angled substantially equidistant from each other or to define the classification areas to be substantially equal in size, the classification vectors to span the classification space; and
assign respective ones of the classes to corresponding ones of the classification vectors based on the ranking of the classes.

7. The apparatus of claim 6, further including a model trainer to train an artificial intelligence model based on the assignment of the classes to the classification vectors.

8. The apparatus of claim 7, wherein the artificial intelligence model is a neural network.

9. An apparatus comprising:
a comparator to rank a plurality of classes to be represented by classification vectors based on respective numbers of instances of training data associated with corresponding ones of the classes, rank of the plurality of classes to be in order from a highest number of instances of the training data to a lowest number of the instances for the training data or from the lowest number of the instances of the training data to the highest number of the instances of the training data; and
a classification space determiner to:
initialize the classification vectors to span a classification space corresponding to the classes; and
assign respective ones of the classes to corresponding ones of the classification vectors based on the ranking of the classes by:
selecting a first class of the classes, the first class corresponding to a first number of training instances;
assigning the first class to a first classification vector;
selecting a second class of the classes, the second class being ranked consecutively relative to the first class; and
assigning the second class to a second classification vector neighboring the first classification vector.

10. An apparatus comprising:
a comparator to rank a plurality of classes to be represented by classification vectors based on respective numbers of instances of training data associated with corresponding ones of the classes, the rank of the plurality of classes to be in order from a highest number of instances of the training data to a lowest number of the instances for the training data or from the lowest number of the instances of the training data to the highest number of the instances of the training data; and
a classification space determiner to:
initialize the classification vectors to span a classification space corresponding to the classes; and
assign respective ones of the classes to corresponding ones of the classification vectors based on the ranking of the classes to ensure a first class with a low rank does not neighbor a second class with a high rank of training instances.

11. A method comprising:
ranking, by executing an instruction with one or more processors, a plurality of classes to be represented by classification vectors based on respective numbers of instances of training data associated with corresponding ones of the classes, the classification vectors defining classification areas in a classification space corresponding to the classes;
initializing, by executing an instruction with the one or more processors, the classification vectors to be angled substantially equidistant from each other or to define the classification areas to be substantially equal in size, the classification vectors to span the classification space; and
assigning, by executing an instruction with the one or more processors, respective ones of the classes to corresponding ones of the classification vectors based on the ranking of the classes.

12. The method of claim 11, further including training an artificial intelligence model based on the assignment of the classes to the classification vectors.

13. The method of claim 12, wherein the artificial intelligence model is a neural network.

14. The method of claim 11, wherein the ranking of the plurality of classes includes ranking the plurality of classes in order from a highest number of the instances of the training data to a lowest number of the training data or from the lowest number of the instances of the training data to the highest number of the instances of the training data.

15. The method of claim 14, wherein the assigning of the respective ones of the classes to the corresponding ones of the classification vectors includes:
- selecting a first class of the classes, the first class corresponding to a first number of training instances;
- assigning the first class to a first classification vector;
- selecting a second class of the classes, the second class being ranked consecutively relative to the first class; and
- assigning the second class to a second classification vector neighboring the first classification vector.

16. The method of claim 14, wherein the assigning the respective ones of the classes to the corresponding ones of the classification vectors is to ensure a first class with a low rank does not neighbor a second class with a high rank of training instances.

* * * * *